Aug. 25, 1942.   J. M. REDINGER   2,293,999
TOOL MOUNTING
Filed April 6, 1940   2 Sheets-Sheet 2
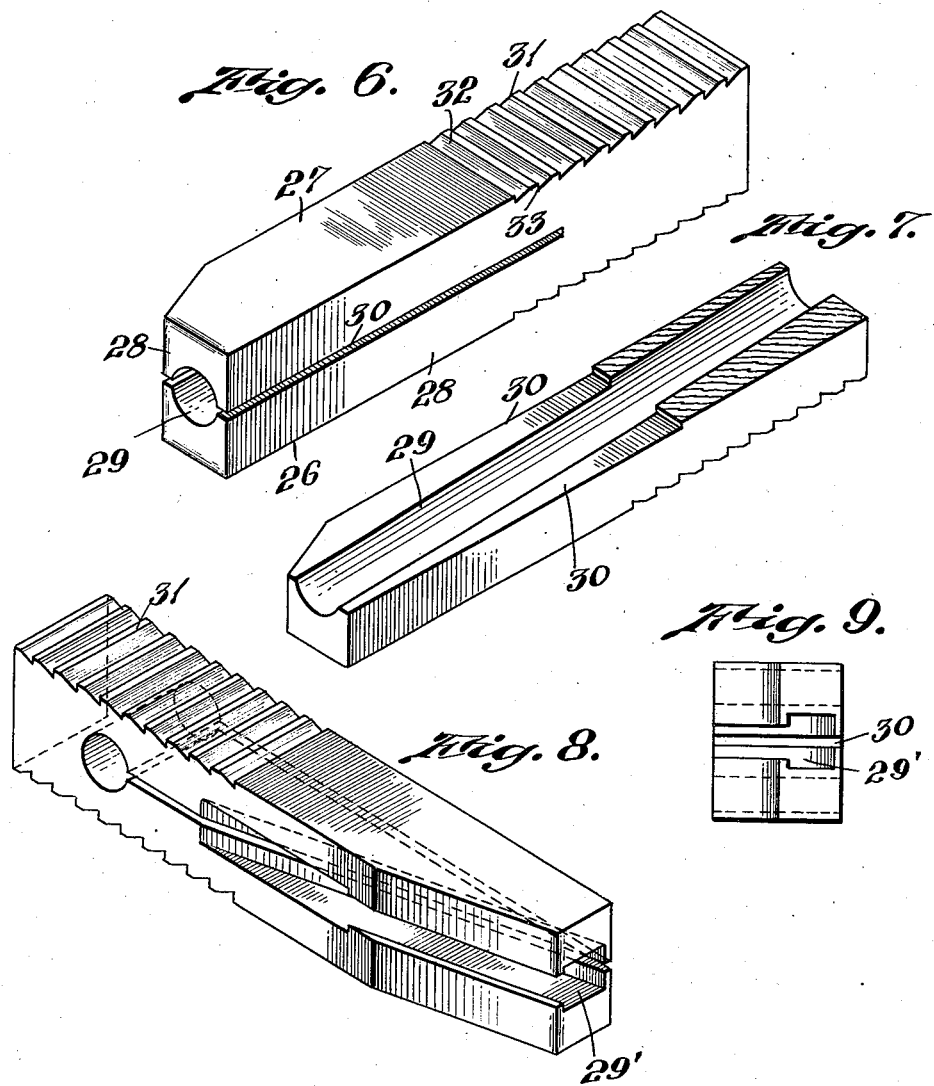
INVENTOR.
Joseph M. Redinger
BY Barlow & Barlow
ATTORNEYS.

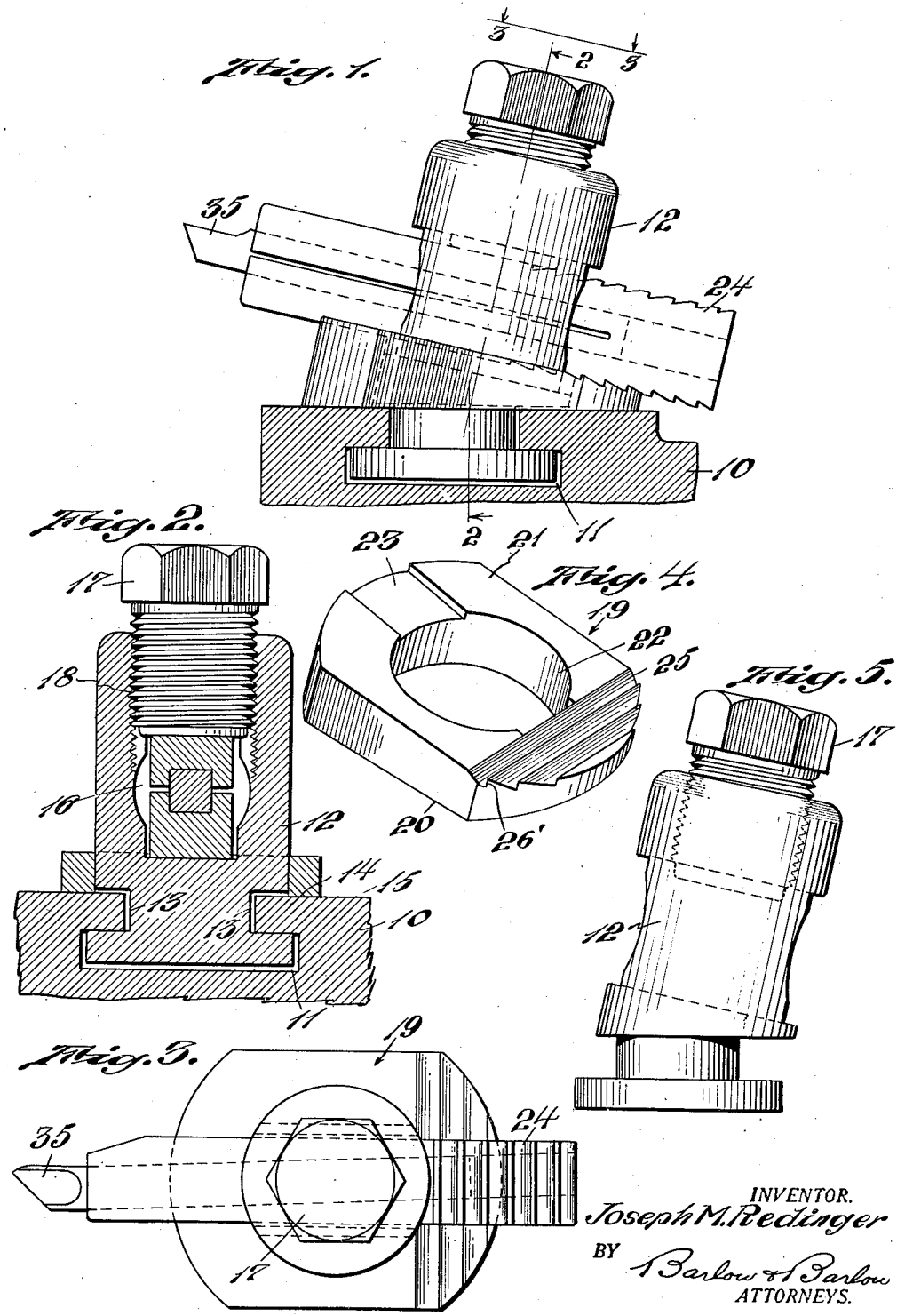

Patented Aug. 25, 1942

2,293,999

UNITED STATES PATENT OFFICE 2,293,999

TOOL MOUNTING

Joseph M. Redinger, Johnston, R. I.

Application April 6, 1940, Serial No. 328,339

7 Claims. (Cl. 82—37)

This invention relates to the mounting of a tool in a lathe and has for one of its objects to provide a mounting which will enable a longer tool to be utilized than has been customary in the past in the use of lathe tools.

Another object of the invention is to provide a more simple holder for positioning a tool at the desired angle to the work than has heretofore been customary.

A further object of the invention is to provide a tool which may be mounted by the turning up of a single binding bolt and yet an arrangement which will be firmly secured in position and will be so held that a very heavy cut may be taken without chattering.

With these and other objects in view, the invention consists of certain novel features of construction, as will be more fully described, and particularly pointed out in the appended claims.

In the accompanying drawings:

Fig. 1 is a side elevation with the cross slide of a lathe in section showing the tool holder as mounted in position;

Fig. 2 is a section on line 2—2 of Fig. 1;

Fig. 3 is a top plan view;

Fig. 4 is a perspective view of the base;

Fig. 5 is a side elevation of the tool post;

Fig. 6 is a perspective view of a modified form of tool holder;

Fig. 7 is a sectional view thereof;

Fig. 8 is a perspective view of a different modified form of tool holder; and

Fig. 9 is an end view thereof.

In the use of lathes it is common commercial practice to provide the bore for the bit at an angle to the top and bottom of the tool holder, an example of which I have illustrated in my patent, No. 2,101,157, dated December 7, 1937; by this arrangement the length of the bit which may be used is limited and short ends frequently are discarded; and in order to overcome this difficulty, I have provided a bore through the tool holder which may take a bit of longer length and theoretically unlimited length. To accomplish this I have inclined the post and the base of the holder to provide the holder at the inclination desired; thus enabling a bore through the holder to receive a bit of extended length which may be increased by inclining the hole in the holder laterally, whereby the tool may have a little lead or inclination heading toward the direction in which it is feeding; and the following is a more detailed description of the present embodiment of this invention, illustrating the preferred means by which these advantageous results may be accomplished:

With reference to the drawings, 10 designates a fragmental portion of the cross slide of a lathe which has an inverted T-shaped slot 11 therein. The post 12 which is usually provided has the usual opposite slots 13 for the reception of the portions 14 of the cross slide so that the same may be moved therein to desired position on the cross slide, but in this case the post 12 does not extend upwardly at right angles to the top surface 15 of the cross slide, but rather is inclined thereto (see Fig. 5). This post has the usual opening 16 laterally through the post and has a clamp 17 threaded onto its end through the threaded bore 18 for engagement with the tool holder.

A base 19 is generally wedge-shaped and has a lower bottom surface 20 and an upper or top surface 21 which is at an angle thereto. A hole 22 in this base is of a size to receive the post rather loosely. This base has a guide slot 23 which receives the tool holder designated 24 and also is provided with a series of steps 25 each of which is inclined to the upper surface 21 connected by straight portions 26 so as to provide a series of ratchet-like teeth.

The tool holder 24, see Figs. 1, 2, and 3, is generally rectangular in shape and has a bottom wall 26 and a top wall 27 and opposite side walls 28. A bore 29, shown square in cross section in Figs. 1, 2, and 3, but which may be round, as shown in Fig. 6 at 29a, or of other cross sections, extends longitudinally through this holder from one end to the other with its axis parallel to the top and bottom surfaces 26 and 27, although this bore preferably extends slightly at an angle to the side walls 28. A slot 30 is provided in the side walls 28 which slot lays in a plane perpendicular to side walls 28 and common with the axis of the bore 29 and extends a substantial extent longitudinally of the holder so as to provide resilient portions which may be sprung toward each other for binding the bit which will be located in the bore 29.

The top and bottom surfaces of the tool holder are serrated as at 31 by inclined portions 32 connected by straight portions 33. These serrations 31 are of a size to fit with the serrations 25 in the top surface of the base so that the tool may be moved notch by notch along the base into an adjusted position.

In some cases, the tool holder may have a bore 29' (see Fig. 8) which will be at a sharper angle to the longitudinal axis of the holder than heretofore provided which in some cases may be more desirable to provide the lead of the tool desired, although it will be realized that the tool holder may be swiveled as a whole upon the surface 15 of the cross slide to present the tool to the work at varying angles. It will also be apparent that a bit such as 35 will correspond to the cross-sectional shape of the bore 29.

In use, the bit 35 will be inserted into the bore 29 and will be of a length to extend substantially through the bore, thus being a multiple of times longer than the bit usually provided.

The cross slide will be elevated to a desired level and the tool holder will be moved across the base so that its height will also be at a desired position. The lead or angularity of the tool holder with reference to the cross slide will be arranged and then the clamping nut 17 will be turned down to draw the tool post 12 upwardly and at the same time force the tool holder and the base downwardly against the surface 15. Serrations or notches will of course prevent relative movement of the tool holder and the base while the slot 23 will assist in lining up the tool holder and the base. When in this position, all the parts will be bound in firm relation, the bit being bound in the tool holder by reason of the resilience caused by the slot 30 and the tool holder to the base, and the base to the cross slide by reason of the single tightening of the nut 17.

It will be apparent that this inclination might be accomplished by other arrangements, although that shown is preferred.

The foregoing description is directed solely towards the construction illustrated, but I desire it to be understood that I reserve the privilege of resorting to all the mechanical changes to which the device is susceptible.

I claim:

1. A tool mounting comprising a single base plate having an opening extending therethrough and a lower flat surface adapted to engage a support and an upper surface at an angle to said lower surface, a post extending at substantially right angles to said upper surface and provided with an opening therethrough, a tool holder extending through said last-mentioned opening and having a surface engaging said upper surface and provided with a bore extending substantially throughout its length generally parallel to its base-engaging surface, and means to clamp the tool holder against the upper surface of said base to incline said holder.

2. A tool mounting comprising a single base plate having an opening extending therethrough and a lower flat surface adapted to engage a support and an upper surface at an angle to said lower surface, a post extending through said opening at substantially right angles to said upper surface and provided with an opening therethrough, a tool holder generally rectangular in cross section with top, bottom and side walls extending through said last-mentioned opening and provided with a bore extending generally parallel to said bottom wall but at an angle to the side walls of said holder and with the said bottom wall engaging said upper surface, and means to clamp the tool holder against the upper surface of said base to incline said holder.

3. A tool mounting comprising a single base plate having an opening therein and a lower flat surface adapted to engage a support and an upper surface at an angle to said lower surface, a post extending from said opening at substantially right angles to said upper surface and provided with an opening therethrough, a tool holder extending through said last-mentioned opening and generally rectangular in cross section with top, bottom, and side walls provided with a bore extending longitudinally through said holder with its axis parallel to the bottom wall and with the said bottom wall engaging said upper surface and means to clamp said tool holder in position on said base.

4. A tool mounting comprising a single base plate having an opening therein and a lower flat surface adapted to engage a support, and an upper surface at an angle to said lower surface, a post extending through said opening at substantially right angles to said upper surface and provided with an opening therethrough, a tool holder extending through the opening in said post and generally rectangular in cross section with top, bottom and side walls provided with a bore extending longitudinally through said holder with its axis parallel to the top wall, and means to clamp said tool holder in position on said base.

5. A tool mounting comprising a single base plate having an opening therein and a lower flat surface adapted to engage a support and an upper surface at an angle to said lower surface, a post extending through said opening at substantially right angles to said upper surface and provided with an opening therethrough, a tool holder extending through said last-mentioned opening and generally rectangular in cross section with top, bottom and side walls provided with a bore extending longitudinally through said holder with its axis parallel to the bottom wall and at an angle to the side walls and with the said bottom wall engaging said upper surface, and means to clamp said tool holder in position on said base.

6. A tool mounting comprising a single base plate having a lower flat surface adapted to engage a support and an upper surface at an angle to said lower surface, a post extending at substantially right angles to said upper surface and provided with an opening therethrough, a tool holder extending through said opening and generally rectangular in cross section with top, bottom and side walls provided with a bore extending longitudinally through said holder with its axis parallel to the top wall and at an angle to the side walls and with the said bottom wall engaging said upper surface, and means to clamp said tool holder in position on said base.

7. A tool mounting comprising a base having a lower surface adapted to engage a support, and an upper surface at an angle to said lower surface, a post extending at substantially right angles to said upper surface and provided with an opening therethrough, a tool holder generally rectangular in cross section with top, bottom, and side walls provided with a bore extending longitudinally through said holder with its axis parallel to the bottom wall, said side walls being slotted longitudinally of said holder a substantial portion of the length of the holder and means for securing said tool holder to said base.

JOSEPH M. REDINGER.